US012023789B2

(12) United States Patent
Lin

(10) Patent No.: US 12,023,789 B2
(45) Date of Patent: Jul. 2, 2024

(54) PLIERS

(71) Applicant: Yi-Ling Lin, Taichung (TW)

(72) Inventor: Yi-Ling Lin, Taichung (TW)

( * ) Notice: Subject to any disclaimer, the term of this patent is extended or adjusted under 35 U.S.C. 154(b) by 463 days.

(21) Appl. No.: 17/400,902

(22) Filed: Aug. 12, 2021

(65) Prior Publication Data

US 2023/0046140 A1 Feb. 16, 2023

(51) Int. Cl.
*B25B 7/04* (2006.01)

(52) U.S. Cl.
CPC ...................................... *B25B 7/04* (2013.01)

(58) Field of Classification Search
CPC .. B25B 5/04; B25B 5/147; B25B 5/16; B25B 7/04; B25B 7/10; B25B 7/12; B25B 7/14; B25B 7/18; B25B 13/10; B25B 13/12; B25B 13/22; B25B 13/48; B25B 13/50; B25B 13/58; B25B 27/10; B25G 1/10
See application file for complete search history.

(56) References Cited

U.S. PATENT DOCUMENTS

| | | | | |
|---|---|---|---|---|
| 2016/0288298 | A1* | 10/2016 | Chen | B25B 7/10 |
| 2018/0281156 | A1* | 10/2018 | Chen | B25B 7/04 |
| 2020/0353599 | A1* | 11/2020 | Gibic | B25B 13/22 |

* cited by examiner

*Primary Examiner* — Robert J Scruggs
(74) *Attorney, Agent, or Firm* — MUNCY, GEISSLER, OLDS & LOWE, P.C.

(57) ABSTRACT

A pliers is provided, including a first member, a second member and a control assembly. The first member has a first grip portion, a first body portion and a first jaw. The first body portion has an engaging face, a slot which is disposed on the engaging face and at least one tooth row which is arranged along the slot. The second member has a second grip portion, a second body portion and a second jaw. A pivot hole is disposed in the second body portion. The control assembly has a positioning member which is movably disposed through the pivot hole and within the slot and an operation member which is rotatably connected with the second body portion. At least one position tooth is disposed on the positioning member. The positioning member is movable with the operation member.

9 Claims, 9 Drawing Sheets

PLIERS

BACKGROUND OF THE INVENTION

Field of the Invention

The present invention relates to a pliers.

Description of the Prior Art

Generally, a conventional pliers includes two plier bodies which are pivotally connected to each other. A pliers, such as pipe pliers, has a guiding groove in one of the two plier bodies and the other of the two plier bodies is slidable along the guiding groove so that the jaw span between respective jaws of the two plier bodies can be adjusted. There are many ways to fix the jaw span adjusted. For example, a plurality of notches recessed radially are provided on at least one sides of the guiding groove, to allow positional engagement of a pivot with which the two plier bodies are pivoted with at least one of the notches, wherein the pivot is radially biased by a spring to ensure the engagement of the pivot; or an elastic member is disposed between the pivot and a tooth row on a plier body, and the pivot is pressed axially to disengage from the tooth row on a plier body.

However, the conventional pliers includes numerous components and is of a complicated structure, so it is difficult to assemble and inconvenient to operate. Additionally, some conventional pliers have short service life. Therefore, there are various deficiencies in manufacturing, assembling and use.

The present invention is, therefore, arisen to obviate or at least mitigate the above-mentioned disadvantages.

SUMMARY OF THE INVENTION

The main object of the present invention is to provide a pliers which is easy to operate and adjust.

To achieve the above and other objects, a pliers is provided, including: a first member, including a first grip portion, a first body portion and a first jaw, the first body portion including an engaging face, a slot and at least one tooth row, the slot being disposed on the engaging face, the at least one tooth row being disposed on the engaging face and arranged along a direction in which the slot extends; a second member, including a second grip portion, a second body portion and a second jaw, the second body portion including a pivot hole disposed therethrough; and a control assembly, including a positioning member and an operation member, the positioning member being movably disposed through the pivot hole and within the slot, the positioning member connecting the first member and the second member, the positioning member including at least one engaging tooth, the at least one engaging tooth facing the engaging face and being disengageably engaged with the at least one tooth row, the operation member being rotatably connected with the second body portion, the operation member including a first end portion and a second end portion, the positioning member being movable with the first end portion, the second end portion being configured to be operated to move the first end portion and the positioning member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
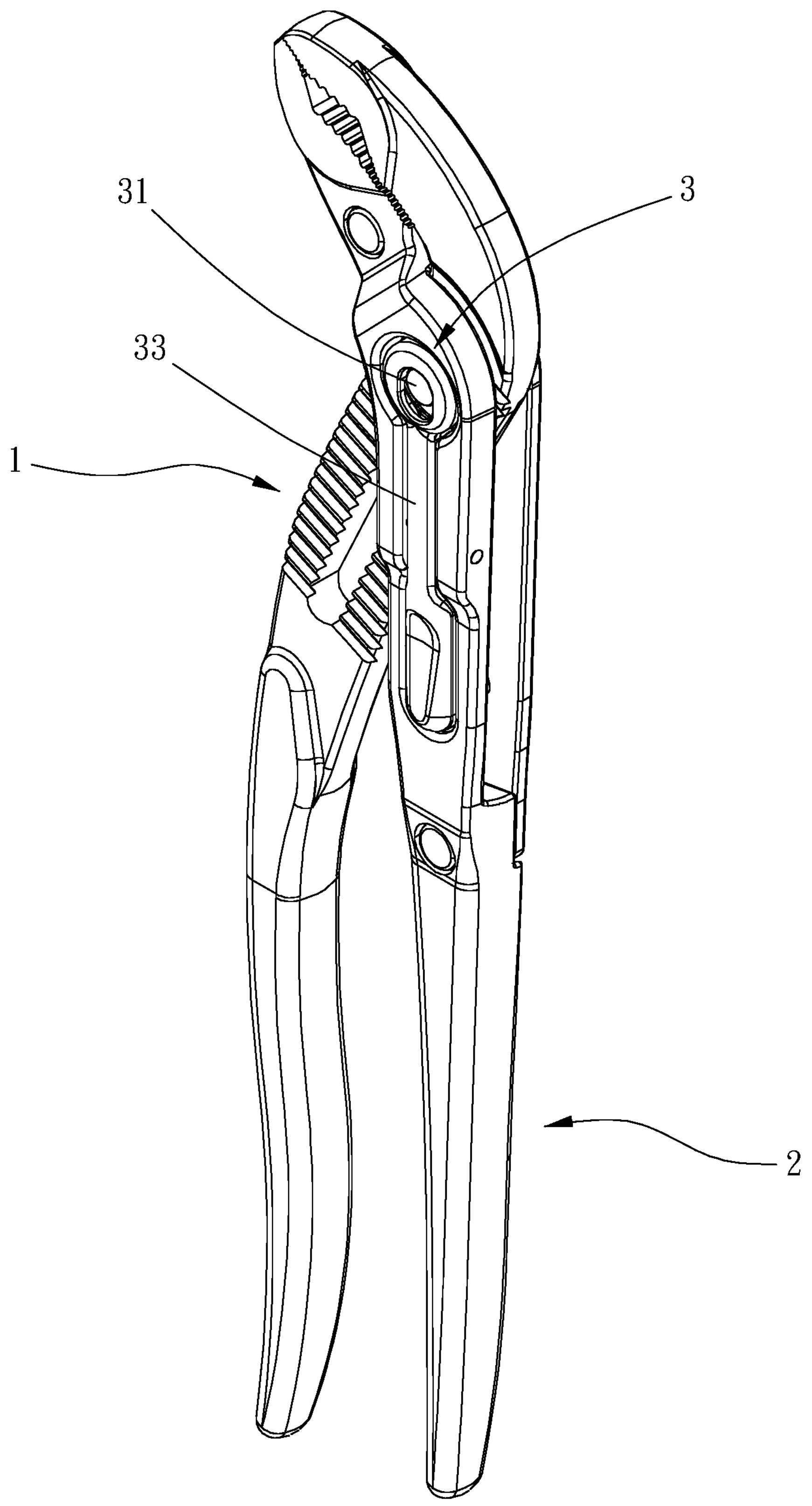
FIG. 1 is a stereogram of a preferable embodiment of the present invention.
Figure 2:
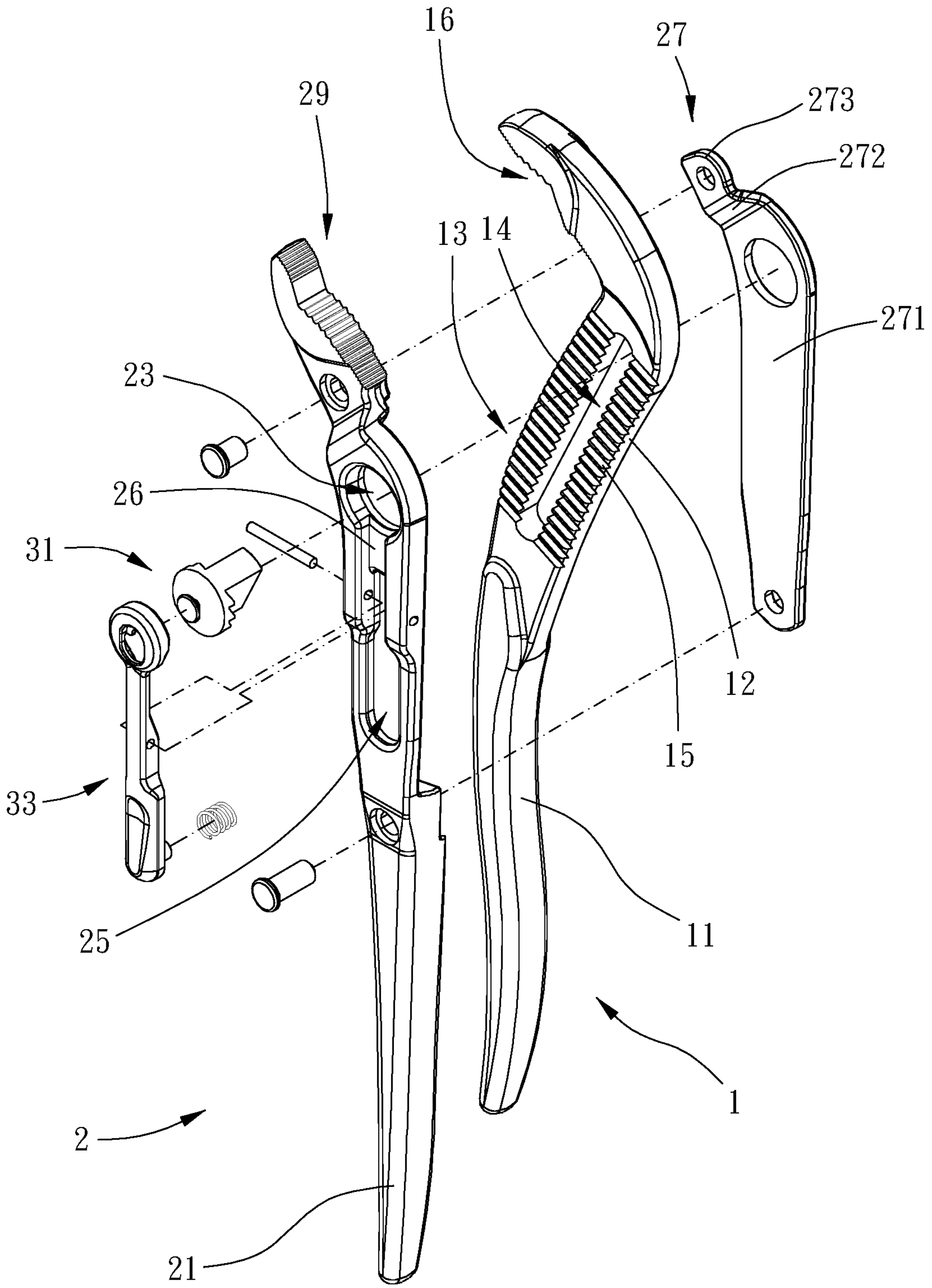
FIG. 2 is a breakdown drawing of a preferable embodiment of the present invention.
Figure 3:
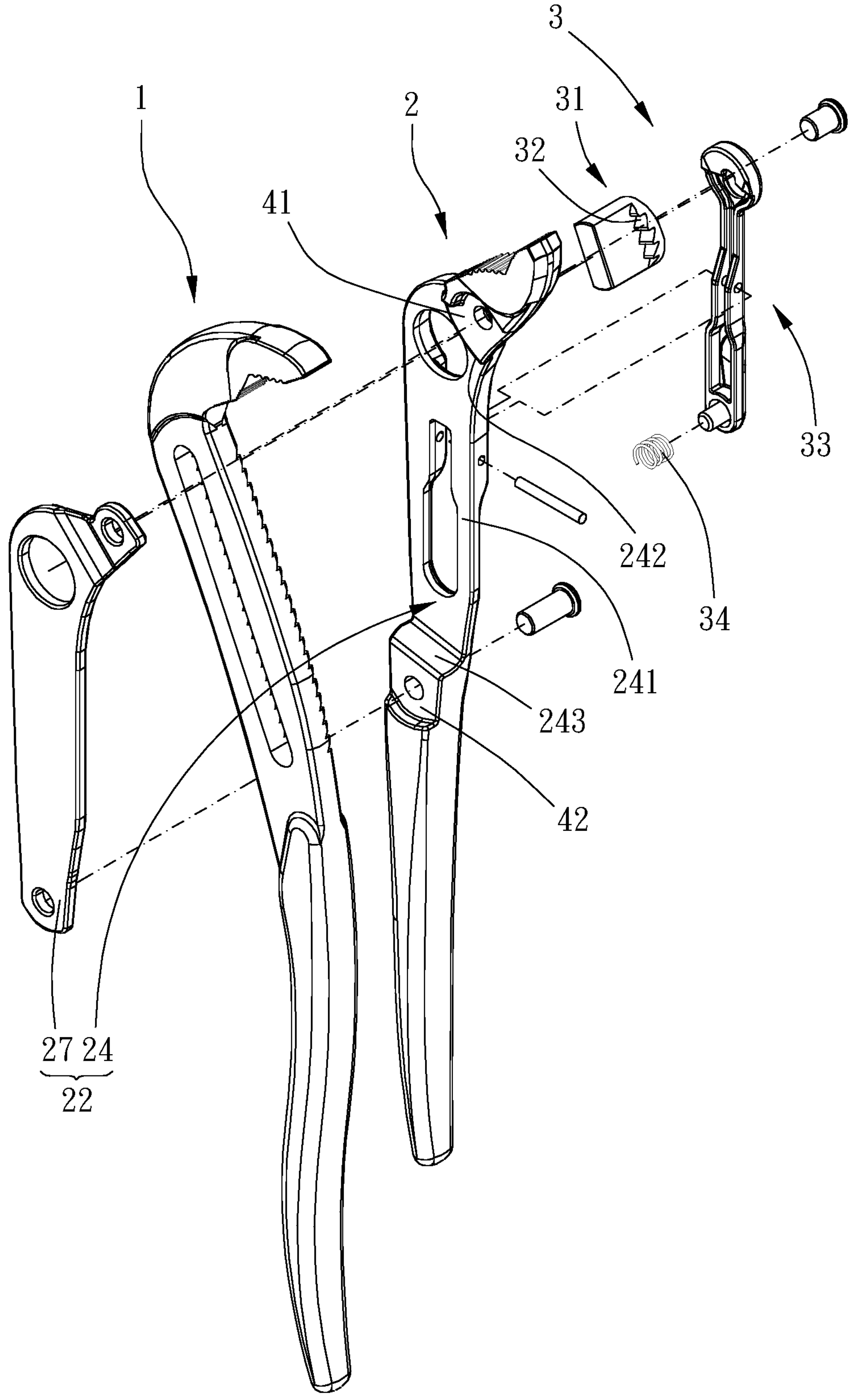
FIG. 3 is another breakdown drawing of a preferable embodiment of the present invention.
Figure 4:
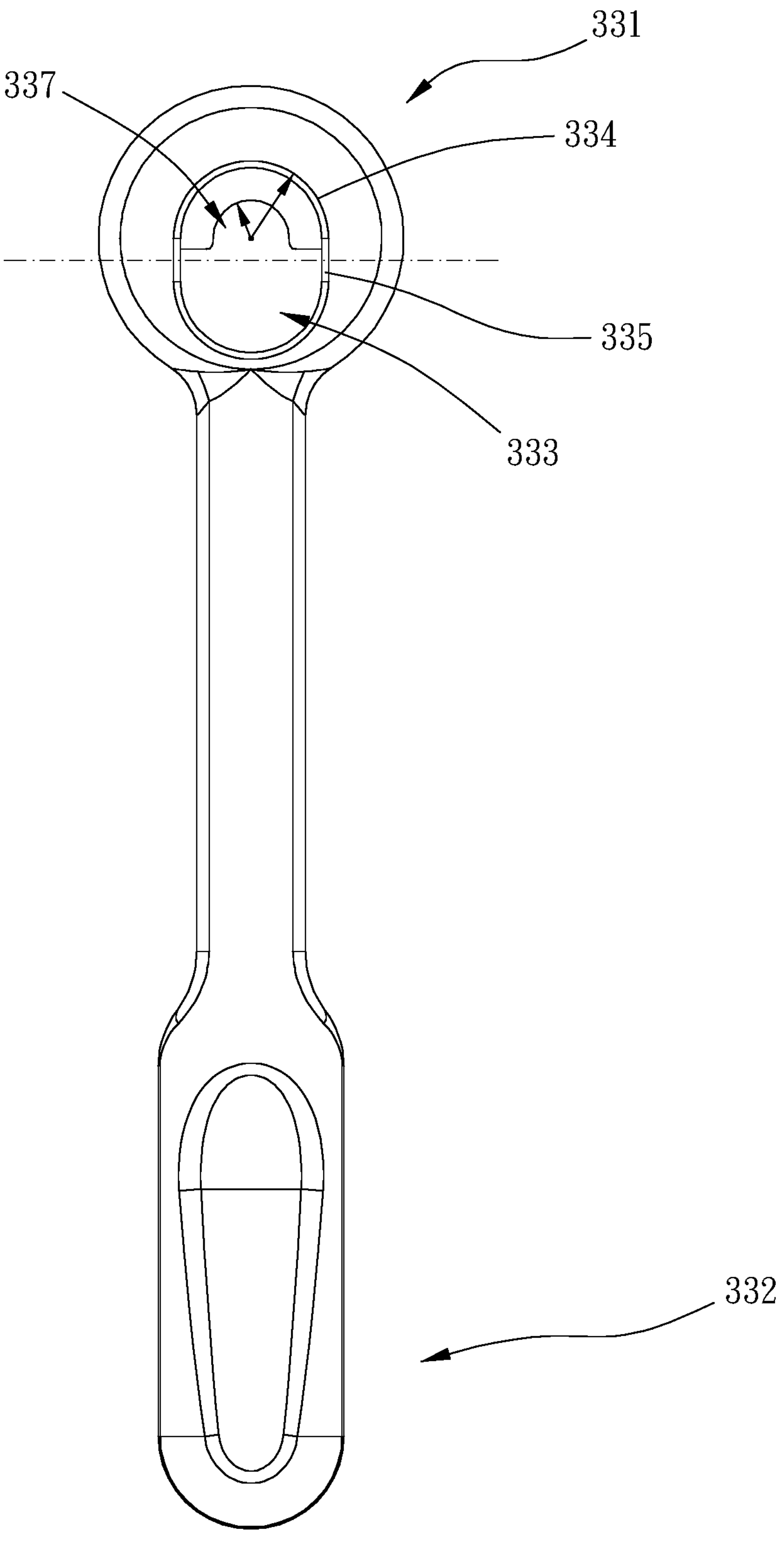
FIG. 4 is a top view of an operation member according to a preferable embodiment of the present invention.
Figure 5:
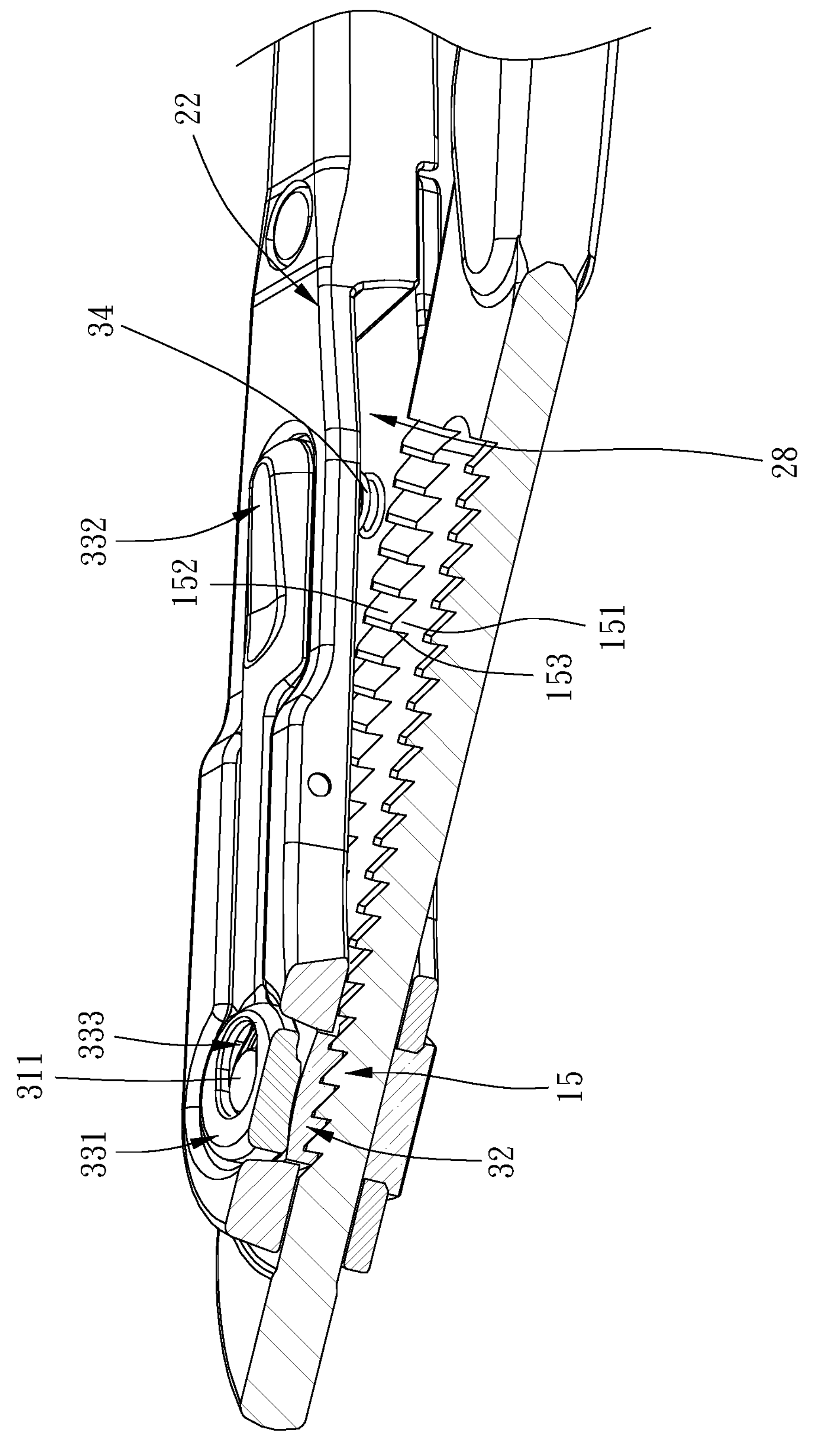
FIGS. 5 and 6 are drawings showing operation of the operation member and a positioning member according to a preferable embodiment of the present invention.
Figure 6:
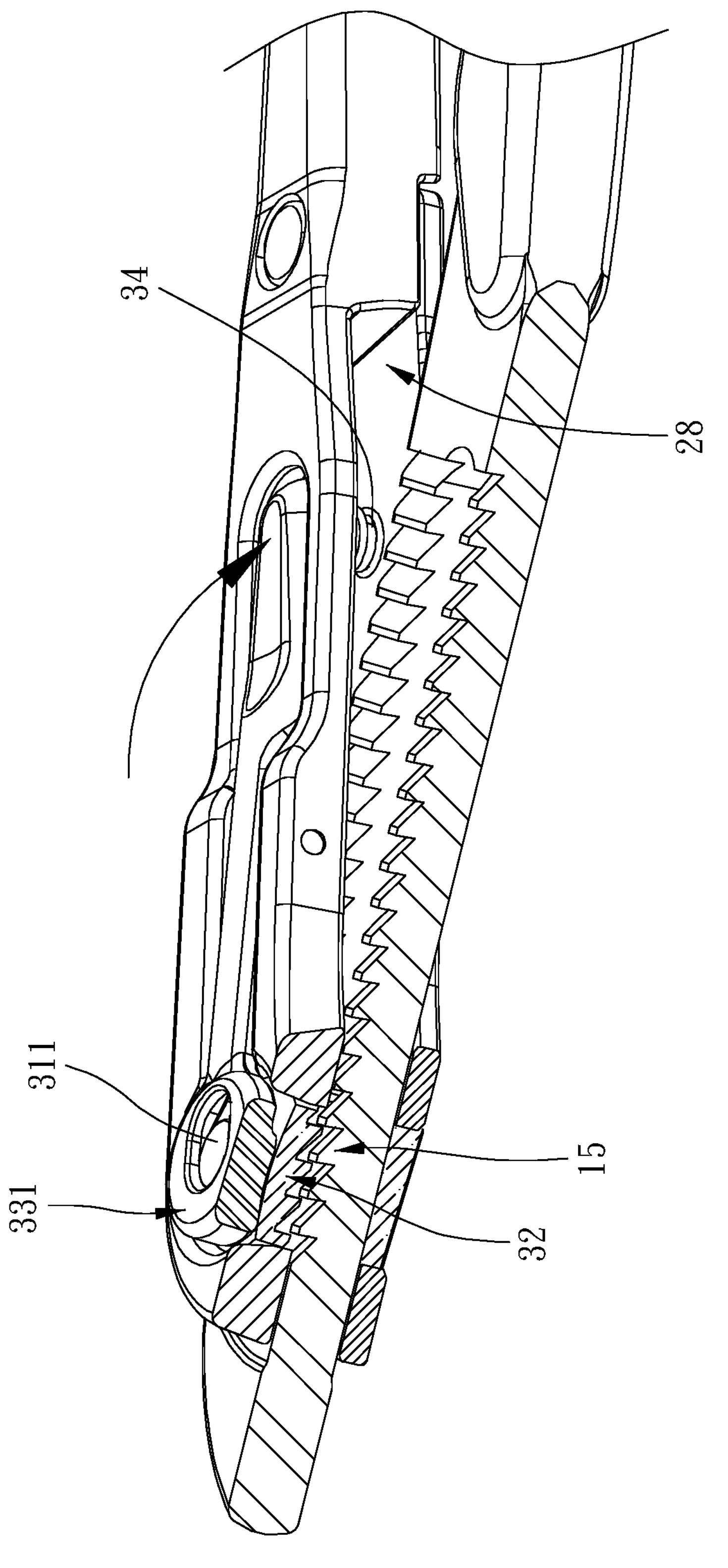
Figure 7:
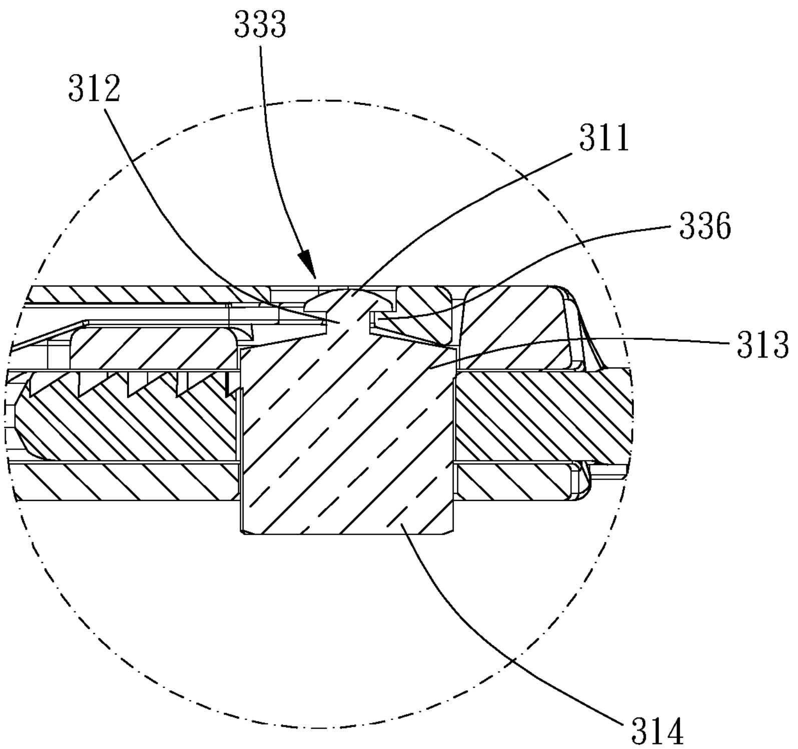
FIG. 7 is a partial enlarged cross-sectional view of a preferable embodiment of the present invention.
Figure 8:
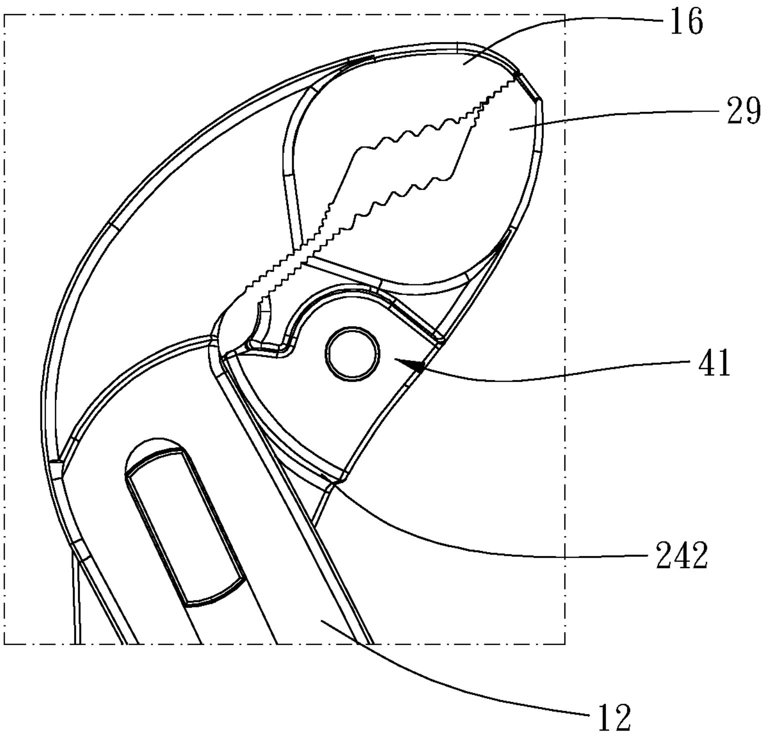
FIGS. 8 and 9 are drawings showing operation of a first jaw and a second jaw of a preferable embodiment of the present invention.
Figure 9:
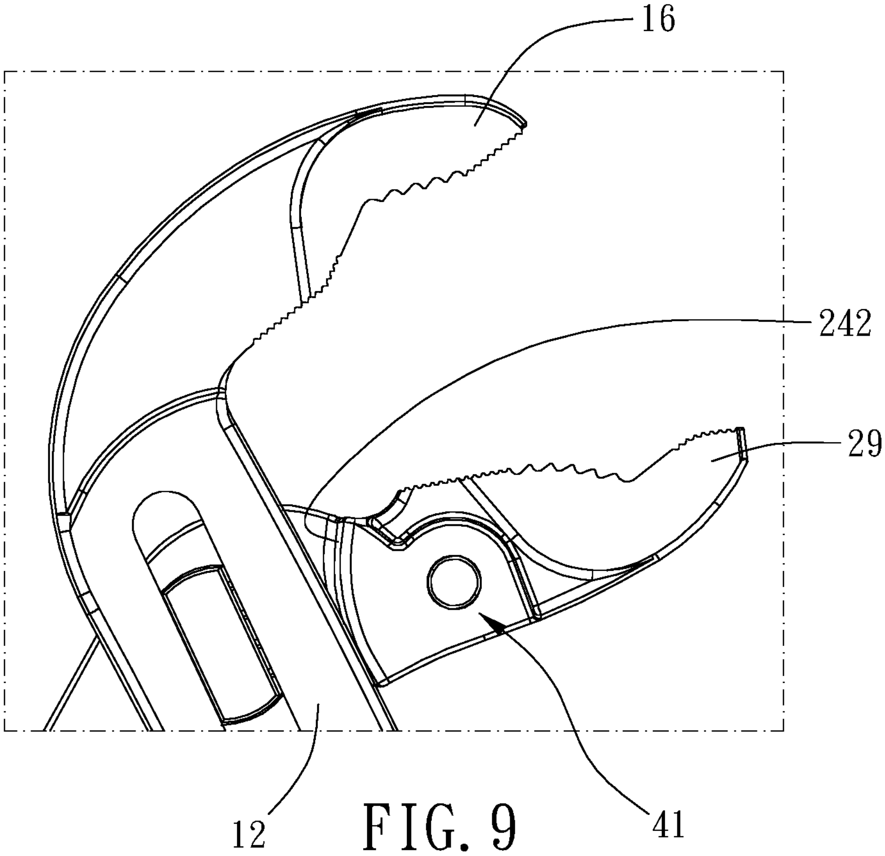
Figure 10:
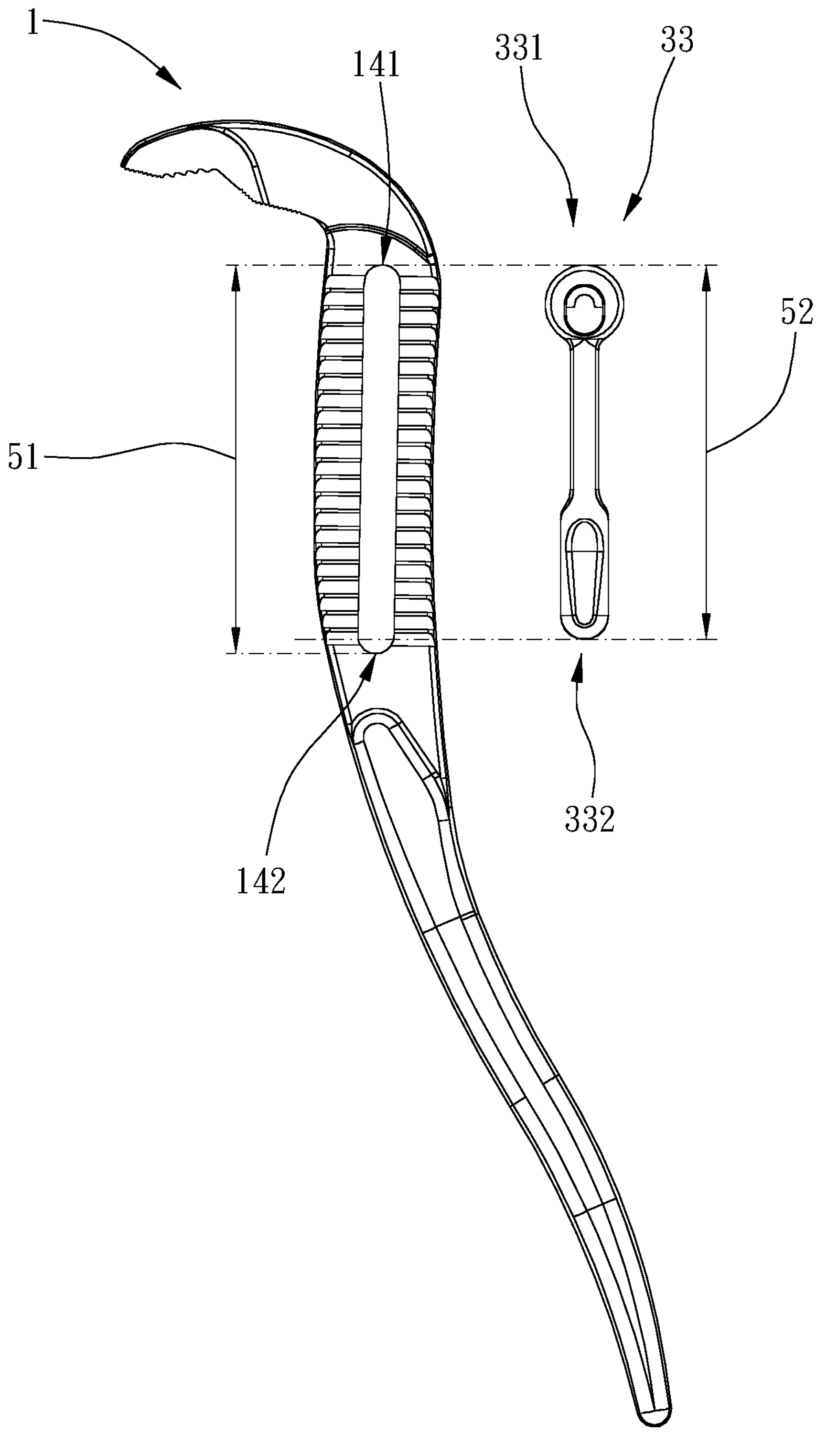
FIG. 10 is a side view showing a first member and the operation member of a preferable embodiment of the present invention.

Please refer to FIGS. 1 to 10 for a preferable embodiment of the present invention. A pliers of the present invention includes a first member 1, a second member 2 and a control assembly 3.

The first member 1 includes a first grip portion 11, a first body portion 12 and a first jaw 16. The first body portion 12 includes an engaging face 13, a slot 14 and at least one tooth row 15. The slot 14 is disposed on the engaging face 13, and the at least one tooth row 15 is disposed on the engaging face 13 and arranged along a direction in which the slot 14 extends. The second member 2 includes a second grip portion 21, a second body portion 22 and a second jaw 29, and the second body includes a pivot hole 23 disposed therethrough.

The control assembly 3 includes a positioning member 31 and an operation member 33, the positioning member 31 is movably disposed through the pivot hole 23 and within the slot 14, and the positioning member 31 connects the first member 1 and the second member 2. The positioning member 31 includes at least one engaging tooth 32, the at least one engaging tooth 32 faces the engaging face 13 and is disengageably engaged with the at least one tooth row 15. In this embodiment, the at least one tooth row includes two tooth rows 15, and the two tooth rows 15 are located at two sides of the slot 14, providing balanced and sufficient engagement. Each of the two tooth rows 15 is in a ratchet-toothed configuration. The at least one engaging tooth includes two engaging teeth 32, the two engaging teeth 32 correspond to the two tooth rows 15, respectively, and the two engaging teeth 32 are in a toothed configuration corresponding to the ratchet-toothed configuration of the two tooth rows 15, respectively. Specifically, the engaging face 13 faces the second member 2, each of the at least one tooth row 15 includes a plurality of teeth 151 extending in a direction transverse to an axial direction of the pivot hole 23, and the at least one engaging tooth 32 extends in a radial direction of the pivot hole 23. Each of the plurality of teeth 151 of the at least one tooth row 15 includes a first surface 152 and a second surface 153, the first surface 152 faces rearward away from the first jaw 16, the second surface 153 faces frontward to the first jaw 16, and as viewed in the radial direction of the pivot hole 23, the first surface 152 has an extent larger than an extent of the second surface 153, and the first surface 152 has an inclination retoward the first jaw 16 greater than an inclination of the second surface 153 toward the first jaw 16.

The operation member 33 is rotatably connected with the second body portion 22 and can rock relative to the second body portion 22. The operation member 33 includes a first end portion 331 and a second end portion 332, and the positioning member 31 is movable with the first end portion 331. In this embodiment, the positioning member 31 and the first end portion 331 are abuttable against each other on a direction in which the first end portion 331 swings. The second end portion 332 is configured to be operated to move the first end portion 331 and the positioning member 31. When the operation member 33 is moved by the positioning member 31, the two engaging teeth 32 disengage from the two tooth rows 15 so that the first member 1 is slidable relative to the second member 2 to adjust the span between the first jaw 16 and the second jaw 29.

The slot 14 is elongated, and the slot 14 includes a first end 141 and a second end 142 opposite to each other. An extent from the first end 141 to the second end 142 is defined as a first length 51. The first end portion 331 of the operation member 33 is adjacent to the second jaw 29, and the second end portion 332 of the operation member 33 is adjacent to the second grip portion 21. A length of the operation member 33 in the direction in which the slot 14 extends is defined as a second length 52. The second length 52 is larger than one half the first length 51 so that the operation member 33 is relatively closer to the second grip portion 21 for easy press by one hand gripping on the second grip portion 21.

The second body portion 22 includes a first part 24 and a second part 27, and the second part 27 and the first part 24 are connected with each other and define an insertion space 28. The combination of the first part 24 and the second part 27 is advantageous for the first body portion 12 to be movably disposed through the insertion space 28.

Specifically, the first part 24 is bent to form the insertion space 28 with the second part 27, the second jaw 29 includes a first recess 41, the second grip portion 21 includes a second recess 42, and the second part 27 is received within the first recess 41 and the second recess 42 and covers the first part 24. The second part 27 is plate-shaped, and the second part 27 includes a first flat portion 271, a bent portion 272 and a second flat portion 273. The bent portion 272 is connected between the first flat portion 271 and the second flat portion 273, and the bent portion 272 is configured to laterally block the first body portion 12.

Specifically, the first part 24 includes a first face 241, a second face 242 and a third face 243, the first face 241 faces the engaging face 13, the second face 242 is laterally connected between the first face 241 and the first recess 41, and the third face 243 is laterally connected between the first face 241 and the second recess 42. The second face 242 serves as a stop face for blocking the first grip portion 11. When the second member 2 rotates, relative to the first member 1, to move the first jaw 16 and the second jaw 29, two opposing ends of the second face 242 are abutted laterally against the first body portion 12. In this embodiment, the second face 242 is arcuate; however, the second face may be flat.

Preferably, the first part 24 includes a through hole 25, the through hole 25 is in communication with the insertion space 28 and the pivot hole 23, and the operation member 33 is swingably received within the through hole 25 so that the first part 24 can protect the operation member 33 from external impact.

Preferably, the control assembly 3 further includes an elastic member 34, the elastic member 34 is abutted between the second end portion 332 and the second body portion 22, and the elastic member 34 biases the second end portion 332 to drive the first end portion 331 to urge the positioning member 31 so that the two engaging teeth 32 are engaged with the two tooth rows 15, which provides good and stable engagement of the first member 1 and the second member 2. The second end portion 332 is kept with its one end up, so it is easy to adjust the span between the first jaw 16 and the second jaw 29 by pressing the second end portion 332 to disengage the two engaging teeth 32 from the two tooth rows 15. Since the second end portion 332 is adjacent to the second grip portion 21, it can disengage the two engaging teeth 32 from the two tooth rows 15 by the thumb of the hand gripping on the second grip portion 21.

Preferably, the first part 24 further includes a supporting portion 26, the supporting portion 26 is located at the through hole 25 and adjacent to the pivot hole 23, and the supporting portion 26 is configured to restrict a limited range within which the second end portion 332 swings toward the two tooth rows 15, which avoids impact of the two engaging teeth 32 to the two tooth rows 15. In this embodiment, the supporting portion 26 is plate-shaped, which provides large contact area for distributing and bearing force.

The positioning member 31 further includes a head portion 311, a neck portion 312, a third body portion 313 and an insertion portion 314. The neck portion 312 and the insertion portion 314 are protrusive beyond two sides of the third body portion 313, respectively. The insertion portion 314 is disposed through the second body portion 22 and within the slot 14. The head portion 311 is disposed on the neck portion 312 and laterally protrusive beyond the neck portion 312. The two engaging teeth 32 are disposed on the third body portion 313, and the first end portion 331 is hooked on the head portion 311 so that the operation member 33 and the positioning member 31 are movable with each other. Specifically, the operation member 33 includes an assembling hole 333 and a rib 336 on the first end portion 331, the rib 336 is laterally protrusive beyond the assembling hole 333, the head portion 311 and the neck portion 312 are inserted within the assembling hole 333, the rib 336 is blocked between the head portion 311 and the neck portion 312, and the rib 336 and the head portion 311 are abuttable against each other on a direction in which the first end portion 331 swings.

Preferably, the head portion 311, the neck portion 312, the third body portion 313, the insertion portion 314 and the at least one engaging tooth 32 are integrally formed of one piece, and thus the positioning member 31 has strong structure, there are few parts required, and it is easy to assembly.

In this embodiment, the assembling hole 333 is elongated, and a portion of the rib 336 exposed from the assembling hole 333 is semi-circular, which facilitates assembling of the head portion 311 into the assembling hole 333. The rib 336 defines a semi-circular hole 337, and the semi-circular hole 337 is located within the assembling hole 333. The assembling hole 333 includes two arched sections 334 and two straight sections 335, and the two arched sections 334 are connected with the two straight sections 335. Preferably, the semi-circular hole 337 and the arched section 334 are concentric, providing easy operation.

It is noted that the cooperative relationship of the first end portion 331 and the positioning member 31 may be carried out by a magnetic manner. For example, a magnet is disposed on at least one of the positioning member and the first end portion, and the positioning member and the first end portion are magnetically attractable with each other.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pliers, including:

a first member, including a first grip portion, a first body portion and a first jaw, the first body portion including an engaging face, a slot and at least one tooth row, the slot being disposed on the engaging face, the at least one tooth row being disposed on the engaging face and arranged along a direction in which the slot extends;

a second member, including a second grip portion, a second body portion and a second jaw, the second body portion including a pivot hole disposed therethrough; and a control assembly, including a positioning member and an operation member, the positioning member being movably disposed through the pivot hole and within the slot, the positioning member connecting the first member and the second member, the positioning member including at least one engaging tooth, the at least one engaging tooth facing the engaging face and being disengageably engaged with the at least one tooth row, the operation member being rotatably connected with the second body portion, the operation member including a first end portion and a second end portion, the positioning member being movable with the first end portion, the second end portion being configured to be operated to move the first end portion and the positioning member;

wherein the engaging face faces the second member;

wherein the at least one tooth row is in a ratchet-toothed configuration, and the at least one engaging tooth is in a toothed configuration corresponding to the ratchet-toothed configuration of the at least one tooth row, each of the at least one tooth row includes a plurality of teeth extending in a direction transverse to an axial direction of the pivot hole, and the at least one engaging tooth extends in a radial direction of the pivot hole;

wherein each of the plurality of teeth of the at least one tooth row includes a first surface and a second surface, the first surface faces rearward away from the first jaw, the second surface faces frontward to the first jaw, and as viewed in the radial direction of the pivot hole, the first surface has an extent larger than an extent of the second surface, and the first surface has an inclination retoward the first jaw greater than an inclination of the second surface toward the first jaw.

2. The pliers of claim 1, wherein the second body portion further includes a first part and a second part, the second part and the first part are connected with each other and define an insertion space, and the first body portion is movably through disposed the insertion space.

3. The pliers of claim 2, wherein the first part includes a through hole, the through hole is in communication with the insertion space and the pivot hole, and the operation member is swingably received within the through hole.

4. The pliers of claim 3, wherein the second part includes a first flat portion, a bent portion and a second flat portion, the bent portion is connected between the first flat portion and the second flat portion, the bent portion is configured to laterally block the first body portion; the positioning member further includes a head portion, a neck portion, a third body portion and an insertion portion; the neck portion and the insertion portion are protrusive beyond two sides of the third body portion, respectively; the insertion portion is disposed through the second body portion and within the slot; the head portion is disposed on the neck portion and laterally protrusive beyond the neck portion; the at least one engaging tooth is disposed on the third body portion; the first end portion is hooked on the head portion so that the operation member and the positioning member are movable with each other; the operation member further includes an assembling hole and a rib on the first end portion, the rib is laterally protrusive beyond the assembling hole, the head portion and the neck portion are inserted within the assembling hole, the rib is blocked between the head portion and the neck portion, and the rib and the head portion are abuttable against each other on a direction in which the first end portion swings; the assembling hole is elongated, and a portion of the rib exposed from the assembling hole is semi-circular; the rib defines a semi-circular hole, and the semi-circular hole is located within the assembling hole; the assembling hole includes two arched sections and two straight sections, and the two arched sections are connected with the two straight sections; the semi-circular hole and the arced arched section are concentric; the head portion, the neck portion, the third body portion, the insertion portion and the at least one engaging tooth are integrally formed of one piece; the control assembly further includes an elastic member, the elastic member is abutted between the second end portion and the second body portion, and the elastic member biases the second end portion to drive the first end portion to urge the positioning member so that the at least one engaging tooth is engaged with the at least one tooth row; the at least one tooth row includes two tooth rows, the two tooth rows are located at two sides of the slot, respectively; the at least one engaging tooth includes two engaging teeth, the two engaging teeth correspond to the two tooth rows, respectively; the first part is bent to form the insertion space with the second part, the second jaw includes a first recess, the second grip portion includes a second recess, and the second part is received within the first recess and the second recess and covers the first part; the first part includes a first face, a second face and a third face, the first face faces the engaging face, the second face is laterally connected between the first face and the first recess, the third face is laterally connected between the first face and the second recess; when the second member rotates relative to the first member to move the first jaw and the second jaw, two opposing ends of the second face are abutted laterally against the first body portion; the first part further includes a supporting portion, the supporting portion is located at the through hole and adjacent to the pivot hole, and the supporting portion is configured to restrict a limited range within the second end portion swings toward the at least one tooth row; the supporting portion is plate-shaped.

5. The pliers of claim 2, wherein the first part is bent to form the insertion space with the second part, the second jaw includes a first recess, the second grip portion includes a second recess, and the second part is received within the first recess and the second recess and covers the first part.

6. The pliers of claim 5, wherein the first part includes a first face, a second face and a third face, the first face faces the engaging face, the second face is laterally connected between the first face and the first recess, the third face is laterally connected between the first face and the second recess; when the second member rotates relative to the first member to move the first jaw and the second jaw, two opposing ends of the second face are abutted laterally against the first body portion.

7. The pliers of claim 1, wherein the slot is elongated, the slot includes a first end and a second end opposite to each other, an extent from the first end to the second end is defined as a first length, the first end portion of the operation member is adjacent to the second jaw, the second end portion of the operation member is adjacent to the second grip portion, a length of the operation member in the direction in which the slot extends is defined as a second length, and the second length is larger than one half the first length.

8. The pliers of claim 1, wherein the positioning member further includes a head portion, a neck portion, a third body portion and an insertion portion; the neck portion and the insertion portion are protrusive beyond two sides of the third body portion, respectively; the insertion portion is disposed through the second body portion and within the slot; the head portion is disposed on the neck portion and laterally protrusive beyond the neck portion; the at least one engaging tooth is disposed on the third body portion; and the first end portion is hooked on the head portion so that the operation member and the positioning member are movable with each other.

9. The pliers of claim 1, wherein the control assembly further includes an elastic member, the elastic member is abutted between the second end portion and the second body portion, and the elastic member biases the second end portion to drive the first end portion to urge the positioning member so that the at least one engaging tooth is engaged with the at least one tooth row.

* * * * *